Figure 1:
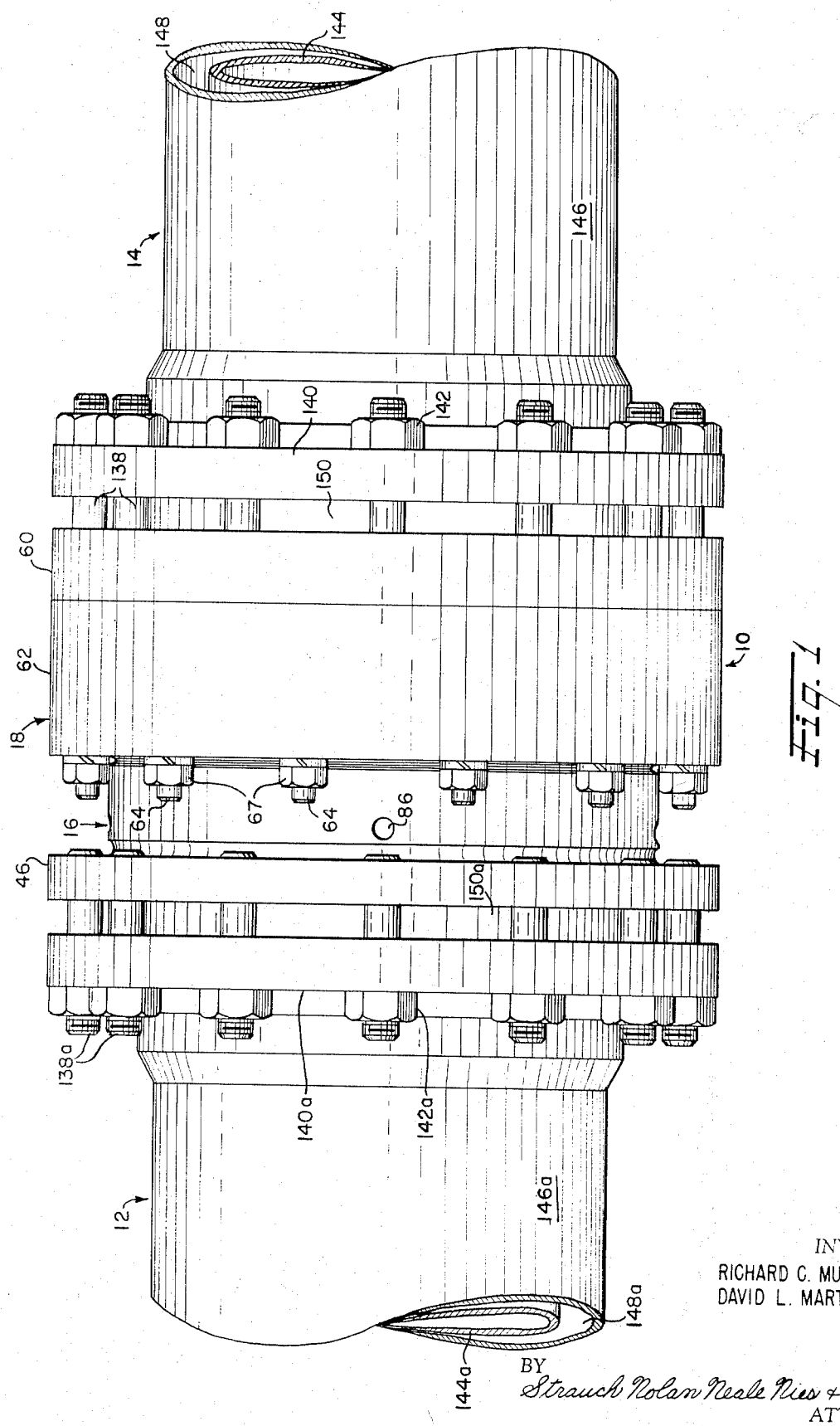

United States Patent [19]
Mursinna et al.

[11] 3,775,989
[45] Dec. 4, 1973

[54] ROTARY CRYOGENIC COUPLINGS

[75] Inventors: Richard C. Mursinna, San Diego; David L. Martindale, La Mesa, both of Calif.

[73] Assignee: Amtek, Inc., New York, N.Y.

[22] Filed: Mar. 31, 1971

[21] Appl. No.: 129,901

[52] U.S. Cl.................. 62/55, 285/47, 285/DIG. 5
[51] Int. Cl. ............................................... F17c 7/02
[58] Field of Search...................... 285/47, DIG. 5; 62/55, 45

[56] References Cited
UNITED STATES PATENTS

| 3,275,345 | 9/1966 | Waldron et al. ..................... 285/47 |
| 3,578,361 | 5/1971 | Corrigan ............................. 285/98 |
| 3,068,026 | 12/1962 | McKamey............................ 285/47 |
| 3,272,534 | 9/1966 | Smith................................. 285/47 |
| 3,280,849 | 10/1966 | Rendos et al. .................... 285/47 X |
| 3,371,946 | 3/1968 | Bleyle, Jr. et al. .................... 285/47 |
| 3,544,135 | 12/1970 | Hoerrner .............................. 285/47 |

*Primary Examiner*—Meyer Perlin
*Assistant Examiner*—Ronald C. Capossela
*Attorney*—Strauch, Nolan, Neale, Nies & Kurz

[57] ABSTRACT

Cryogenic liquid handling components connected for relative rotational movement by a coupling which includes two relatively rotatable sub-assemblies connectable to the cryogenic components, components forming a liquid flow path through the sub-assemblies, and components for reducing the transfer of heat through the coupling and the coupling-cryogenic component interfaces to liquid flowing through the coupling and the cryogenic components.

28 Claims, 2 Drawing Figures

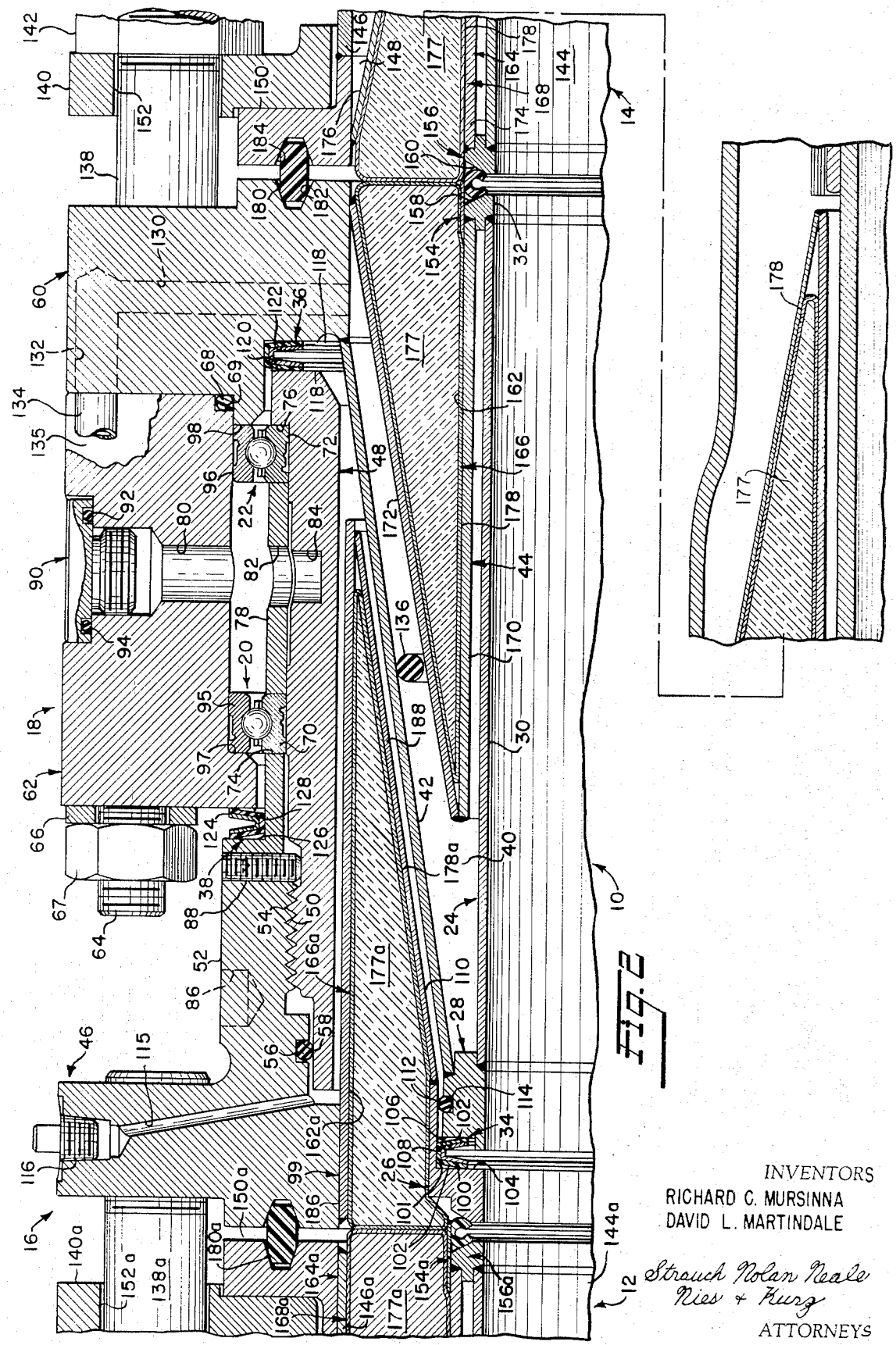

ROTARY CRYOGENIC COUPLINGS

This invention relates to systems for handling cryogenic liquids and, more particularly, to novel, improved devices for coupling and permitting relative rotation between two transfer lines or other cryogenic handling components.

Cryogenic liquids such as liquid oxygen, liquid nitrogen, and liquid hydrogen are valuable commodities. They are usually transferred from one location to another through vacuum jacketed transfer lines to reduce the flow of heat into the liquid and thereby minimize vaporization and consequent loss of the liquid. In a typical transfer system there will be one or more points or interfaces where provision must be made for allowing one transfer line to rotate relative to another. Heretofore, this has usually been accomplished by the use of flexible line or joint assemblies.

While such assemblies permit the necessary relative rotational movement and allow only a low heat leak into the cryogenic liquid flowing through them, they do have important disadvantages. They are of a thin walled construction and consequently are easily damaged by impact. Also, because of their contruction, such assemblies are readily damaged by corrosion when used in corrosive environments. Furthermore, such assemblies transmit the full torsional loads imposed on them and accordingly are subject to failure by flexure, especially when one of the cryogenic components between which the assembly is connected is fixed against rotation.

It is an important and primary object of the present invention to provide novel rotary couplings for connecting and permitting relative rotation between two cryogenic liquid transfer lines or other cryogenic liquid components which do not have the disadvantages discussed above and which, more particularly, provide relative rotation between such components while minimizing heat flow into a liquid therein and, at the same time, are rugged, not damaged by corrosion, and are free from torsional stressing.

Another important object of the invention resides in the provision of rotary cryogenic couplings in accord with the preceding object which occupy a minimum of space.

The novel rotary couplings of the present invention, by which the foregoing and other important objects are achieved, include two flange assemblies which are connectable to two transfer lines or other cryogenic liquid components which are to be made rotatable relative to each other. Free relative rotation of the flange assemblies and therefore the components fixed to them is obtained by bearings interposed between them which operate at ambient termperature.

Components carried by the flange assemblies form a cryogenic liquid conduit through the coupling. A dynamic sliding seal between the conduit components carried by the respective flanges confines the liquid to the conduit while permitting small amounts of the liquid to escape into a sealed space around the conduit. This liquid vaporizes, equalizing the hydrostatic pressure on the dynamic seal and thereby reducing the pressure on it to the head pressure of the liquid flowing through the coupling. Also, by pressurizing the interior of the coupling, the vaporized liquid keeps internal coupling components from collapsing.

A second dynamic sliding seal engageable with sealing surfaces on the two flange assemblies keeps vapor from escaping from the sealed space just mentioned through the interface between the assemblies. And a third seal of the same type keeps foreign matter from penetrating through the interface between the flange assemblies to the bearings therebetween. Both of these dynamic seals operate at ambient temperature.

To minimize the transfer of heat into liquid flowing through the conduit portion of the coupling, a sealed chamber surrounding the conduit (typically over 90 percent of its length) is provided. This chamber is formed by members carried by one of the flange assemblies. After assembly of the coupling, the chamber is evacuated, thereby providing a barrier to the transfer of heat through the coupling by convection and conduction.

Also located in the annular space between the flange assemblies and the inner conduit in telescoped relationship are two insulation modules which are supported from the respective flange assemblies by frustoconically configured seal assemblies. These co-operate with nose seals at the ends of the conduit and similar insulating arrangements in the cryogenic liquid components between which the coupling is connected to minimize the flow of heat into the cryogenic liquid through the interfaces between the coupling and the cryogenic liquid components.

As indicated above, one of the important advantages of a coupling in accord with the present invention is that it effectively limits the flow of heat into a cryogenic liquid flowing through it. In fact, these novel couplings possess an effectiveness in this reqard which is comparable to that of the highly regarded bayonet type of non-rotatable coupling.

Also, the novel bearing arrangement described above makes the flange assemblies of the coupling and the components to which they are connected freely rotatable relative to each other. This eliminates the imposition of torsional stresses on the coupling and the deterioration which can result therefrom.

The rotary couplings of the type just described are extremely compact. For a given inner conduit diameter, the maximum outside diameter of the coupling will not exceed the diameter of a standard 150 pound flange for the line size. Also, because of the overlapping arrangement of the two flange assemblies and the components disposed between the flange assemblies and the inner conduit, the length of the coupling is reduced to a minimum.

Since no flexing of the coupling components is involved, the couplings of the present invention can employ components of relatively heavy section. They are consequently extremely rugged and damage resistant.

A number of features and advantages and the primary objects of the present invention have been identified above. Other important objects and advantages of the present invention and further novel features thereof will become apparent from the appended claims and from the ensuing detailed description and discussion of the invention as it proceeds in conjution with the accompanying drawing, in which:

FIG. 1 is a side view of a rotary cryogenic coupling in accord with the principles of the present invention, the coupling being interposed between and connected to two cryogenic components; and FIG. 2 is a partial longitudinal section through the coupling and cryogenic components of FIG. 1.

Referring now to the drawing, FIG. 1 depicts a cryogenic rotary coupling 10 in accord with the present invention. Coupling 10 is connected between cryogenic components 12 and 14 in the form of vacuum jacketed transfer lines.

As best shown in FIG. 2, cryogenic coupling 10 includes overlapping flange assemblies 16 and 18 between which bearings 20 and 22 are interposed. An inner conduit 24 is disposed concentrically within the flange assemblies and is in part formed by a liquid seal support ring 26 which rotates with flange assembly 16. The remaining conduit-forming members are carried by and rotate with flange assembly 18. These include a cryogenic seal support housing 28, an inner line tube 30, and a nose seal retainer 32, all joined into a unitary structure.

The coupling also includes a dynamic sliding seal 34 disposed between seal ring 26 and support housing 28 which keeps liquid from escaping from conduit 24 through the interface between the conduit-forming components carried by flange assemblies 16 and 18, respectively; a dynamic, sliding, primary vapor seal 36 at an interface between flange assemblies 16 and 18; and a dynamic environmental seal 38 between the flange assemblies which keeps foreign matter from penetrating to bearings 20 and 22.

A further important feature of coupling 10 is a chamber 40 which surrounds cryogenic liquid conduit 24 and, in a typical application of the invention, spans on the order of 90 percent of the conduit. This chamber, which is bounded by supports 28 and 32, middle cone 42, and a frustoconically sectioned seal arrangement 44, is evacuated after the coupling is assembled. This reduces conductive and convective transfer of heat from the ambient surroundings into liquid flowing through conduit 24.

Referring still to FIG. 2, flange assembly 16 includes a flange member proper, identified by reference character 46, and a cylindrical inner bearing sleeve 48. These two components are joined into a unitary structure by co-operating internal threads 50 in the hub portion 52 of the flange and external threads 54 on the sleeve. An O-ring 56 disposed in an annular recess 58 in flange 46 and engaging the periphery of sleeve 48 provides a static vapor seal between the flange and bearing sleeve.

Flange assembly 18 includes an annular flange member 60 and a cylindrical bearing collar 62. These two components are secured together by studs 64, which are threaded into flange 60 and extend through the bearing collar; by washers 66; and by nuts 67. An O-ring 68 disposed in an annular groove 69 in bearing collar 62 provides a static vapor seal between it and the flange 60 of flange assembly 18.

As shown in FIG. 2, the inner races 70 and 72 of bearings 20 and 22 are axially or longitudinally fixed by a bearing surface 74 at the end of flange 46, by an annular shoulder 76 adjacent the right-hand end of inner bearing sleeve 48, and by a cylindrical bearing spacer 78 surrounding sleeve 48 and disposed between the bearings. In assembling coupling 10, flange 46 is threaded along sleeve 48 to preload bearings 20 and 22. This is accomplished by inserting a tool (not shown) through apertures 80 and 82 in bearing collar 62 and spacer 78 into blind bore 84 in bearing sleeve 48. This keeps sleeve 48 from rotating relative to flange assembly 18. An appropriate spanner (likewise not shown) is then engaged in aperture 86 in flange 46 and the flange rotated relative to sleeve 48. This decreases the spacing between bearing surfaces 74 and 76 and preloads the bearings. When the bearings have been preloaded to the desired extent, setscrews 88 threaded in flange 46 are rightened against sleeve 48 to maintain the adjustment between it and the flange. The tool employed to immobilize sleeve 48 is then removed and a plug 90 threaded into the bore 80 through collar 62. An O-ring 92 in an annular recess 94 formed in the plug provides a vapor seal at the interface between the plug and collar 62.

The outer races 95 and 96 of bearings 20 and 22 are engaged by an annular bearing surface 97 formed in bearing collar 62 and an annular bearing surface 98 formed at the end of flange 60. Thus, the bearing arrangement prevents axial movement of flange assembly 18 relative to flange assembly 16 while allowing these two assemblies to rotate freely relative to each other.

Furthermore, bearings 20 and 22 operate substantially at ambient temperature since there is only minimal transfer of heat between the components by which they are contacted and the inner conduit 24 through which the cryogenic liquid flows. This considerably enhances the capability of these bearings to minimize the resistance to rotation between flange assemblies 16 and 18.

Referring again to FIG. 2, conduit-forming support ring 26 is supported from flange 46 of flange assembly 16 by frustoconically sectioned seal assembly 99 and accordingly rotates with assembly 16 as mentioned above. The adjacent conduit-forming component 28, liner 30, and nose seal retainer 32 are supported from the flange 60 of flange assembly 18 by middle cone 42. These conduit-forming components accordingly rotate with flange assembly 18. Consequently, a sliding seal is employed to keep the cryogenic liquid from escaping from conduit 24 through the interface between ring 26 and support 28. The illustrated seal 34, which is of a commercially available construction, has a generally U-shaped cross-sectional configuration and consists of a metallic base member 100 with a coating 101 of Kel-F[1] (1. Kel-F is a high-molecular-weight copolymer of chlorotrifluoroethylene and vinylidene fluoride manufactured by the 3M Company. This material is preferred at the present time because it is slough resistant at cryogenic temperatures.), Teflon, or similar cryogenic bearing material. The legs 102 of the seal engage annular bearing surfaces 104 and 106 formed on ring 26 and support 28, respectively. Seal 34 is installed in a pre-compressed configuration so that the legs 102 of the seal will relax and remain in contact with the bearing surfaces as ring 26 and support 28 are chilled by cryogenic liquid flowing through conduit 24 and the bearing surfaces move apart.

Apertures 108 are formed through seal 34 at intervals therearound. These apertures, grossly exaggerated in size in FIG. 2, will typically have a diameter on the order of 0.03 inch. They allow minute quantities of the cryogenic liquid flowing through conduit 24 to escape from the conduit into a chamber 110 surrounding conduit 24 and bounded by static seal 56, the flange 46 and inner sleeve 48 of flange assembly 16, seal assembly 99, ring 26, annular support 28, and middle cone 42. Liquid escaping into chamber 110 through ports 108 vaporizes, filling the chamber with cryogenic liquid vapor. This equalizes the hydrostatic pressure on seal 34 so that the only force which this seal need withstand is that attributable to the head pressure of the liquid flowing through conduit 24. The pressure generated by the vapor also equalizes forces in the coupling to keep the members of seal 99 from collapsing. At the same time, as there is no liquid in chamber 110, transfer of heat through it from the ambient surroundings into the liquid in conduit 24 is minimal.

As is apparent from FIG. 2, the ring member 26 which rotates with flange assembly 16 in part overlies the annular support member 28 which rotates with bearing assembly 18. To insure that these two components can rotate freely relative to each other, a ringlike bearing 112 of Kel-F, Teflon, or the like is disposed between the two components in an annular recess 114 in support member 28.

The annular chamber 110 just described is connected to the exterior of coupling 10 by a bore 115 through flange 46. A plug 116 is normally threaded into flange 46 to seal the exterior end of passage 115. Plug 116 can be removed and replaced with a suitable pressure measuring instrument (not shown) to monitor the pressure in chamber 110.

Referring again to FIG. 2, the line pressure vapor in chamber 110 is prevented from escaping through the interface between flange assemblies 16 and 18 by the sliding, dynamic, primary vapor seal 36 mentioned briefly above, which may be of substantially the same construction as seal 34. The legs 118 of the seal engage annular bearing surfaces 120 and 122 formed on inner bearing sleeve 48 and flange 60, respectively. Like bearings 20 and 22, this seal remains substantially at ambient temperature even after the coupling is chilled down by the passage of cryogenic liquid through conduit 24. Therefore, the seal is capable of providing a highly effective vapor seal between the two flange assemblies.

The third dynamic sliding seal, environmental seal 38, may be of the same construction as seals 34 and 36. The legs 124 of this seal engage and slide along an annular bearing surface 126 on the flange 46 of flange assembly 16 and a bearing surface 128 at the left-hand end of bearing collar 62. This component also operates at substantially ambient termperature and provides a highly effective seal at the interface between flange 46 and collar 62.

As indicated above, the flow of heat into the liquid passing through the conduit 24 is minimized by evacuating the chamber 40 surrounding conduit 24, which is bounded in part by middle cone 42. This cone is sealed at its inner end to support member 28 and at its outer end to flange 60. The configuration of chamber 40 is completed by liner 30, nose seal support 32, and the members of frustoconical seal 44. Chamber 40 is evacuated through communicating bores 130 and 132 in flange 60 and a tube 134 communicating with the latter. After evacuation, tube 134 may be pinched off to permanently seal chamber 40. The pinch tube is disposed in a peripheral recess 135 in bearing collar 62. This keeps it within the confines of the coupling and thereby prevents it from being caught and ruptured.

As will be apparent from FIG. 2, there is a pressure differential across middle cone 42 as there is a vacuum on one side of the cone and line pressure on the other. To provide added resistance to this pressure differential, a transversely oriented stiffening ring 136 is fixed to the middle cone intermediate its ends.

Referring now to both FIGS. 1 and 2, vacuum jacketed cryogenic components 12 and 14 are connected to coupling 10 by studs 138, coupling rings 140, and nuts 142. More specifically, as best shown in FIG. 2, cryogenic components 12 and 14 are of the conventional double-walled or jacketed type and each includes an inner fluid-containing conduit 144 surrounded by an outer conduit 146 and separated therefrom by an annular space 148. The outer conduit 146 of each component terminates in a radial flange 150 against which the associated coupling ring 140 is positioned.

Cryogenic component 14 is secured to coupling 10 by studs 138 which are threaded into the flange 60 of flange assembly 18 and extend through apertures 152 in coupling ring 140. Nuts 142 threaded on studs 138 pull coupling ring 140 against flange 150, fixing the cryogenic component to the coupling.

A banded nose seal 154 is employed to keep liquid from escaping through the interface between the inner conduit 144 of cryogenic component 14 and the conduit 24 through coupling 10. This seal is disposed between the nose seal support 32 in coupling 10 and a similar, annular or ringlike nose seal support 156 attached to the end of the inner conduit 144 in cryogenic component 14. The seal engages inclined, annular sealing surfaces 158 and 160 formed on members 32 and 156, respectively.

Holes, again typically on the order of 0.03 inch in diameter (not shown), are formed in nose seal 154. These allow minute quantities of liquid flowing through inner conduits 144 and 24 to escape into a cavity 162 surrounding the inner conduits, which is defined by the sealing assembly 44 in coupling 10 and a co-operating sealing assembly 164 in cryogenic component 14. As in the case of the dynamic, sliding liquid seal 34 discussed previously, the liquid escaping through nose seal 154 vaporizes in the cavity, equalizing the hydrostatic pressure on the nose seal.

To keep convection current from arising in the cavity 162, insulation modules 166 and 186 are disposed in seals 44 and 164. More particularly, seal 44 includes a cylindrical inner leg 170 sealed to support 32 and a conical outer leg 172 sealed at its outer end to the flange 60 of flange assembly 18. The inner end of conical leg 172 is sealed to the opposite end of the cylindrical leg 170 of the seal.

The co-operating seal 164 of cryogenic component 14 includes a cylindrical leg 174 sealed at one end to nose seal support 156 and at the other to the inner end of a concically configured outer seal member 176. The outer end of conical member 176 is sealed to the flange 150 at the end of the inner conduit 144 in the component.

The insulation modules 166 and 168 mounted in seals 44 and 162 each include a body 177 of a structurally integral material of low thermal conductivity encased in a substantially gas-tight membrane or shroud 178.[2] (2. For low pressure oxygen and nitrogen service the membranes may be omitted, if desired.) The insulation bodies 177 can be made from any one of a variety of materials such as polyurethane and foamed fluoroplastics or be of a honeycomb type of material. In this case they will typically be formed of Fiberglas or a polyamide, and the cells may be filled with low density foams. The encapsulating membrane or shroud 178 will typically be made from a metal such as stainless steel or a low permeability plastic. Insulation modules of the type just described are disclosed in detail in co-pending application No. 44,019 filed June 8, 1970, which is hereby incorporated by reference.

To keep vapor from escaping from cavity 162, a static vapor seal 180 is employed. This seal spans the gap between coupling flange 60 and cryogenic component flange 150 and is seated in recesses 182 and 184 formed in flanges 60 and 150, respectively.

Cryogenic component 12 is connected to flange 46 of coupling 10 in essentially the same manner as cryogenic component 14, and like reference characters have been employed to identify corresponding components at both interfaces excapt that those at the left-hand end of the coupling are followed by the letter a. The connections, however, do differ in that the seal 99 at the left-hand end of coupling 10 is inverted relative to seal 44. That is, seal 99 includes a cylindrical outer member 186 sealed at one end to coupling flange 46 and at the other to the outer end of a conical seal leg 188. The inner end of conical leg 188 is sealed to the annular support 28 described previously. As is apparent from FIG. 2, this arrangement permits seal 99 to be telescoped over seal 44, thereby reducing the length of coupling 10.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A cryogenic coupling of the rotary type, comprising a pair of flange members; bearing sleeves fixed to said flange members and co-operating therewith to provide first and second coupling means; bearing means disposed between said sleeves for making each of said flanges rotatable relative to the other; means including a member rotatable with each of said coupling means for providing a cryogenic liquid flow component concentrically disposed within the coupling means, whereby there is an annular space between said conduit means and the coupling means; means in said annular space for reducing the flow of heat from the ambient surroundings through the coupling into a cryogenic liquid in said conduit means; and means for providing limited fluid communication between the inside and outside of the conduit means, whereby limited amounts of the cryogenic liquid can flow into and vaporize in a space between the conduit means and the coupling means and thereby equalize the hydrostatic pressure on the opposite sides of said seal means and reduce the pressure on the seal means to the head pressure of the cryogenic liquid in the conduit means.

2. A cryogenic coupling of the rotary, jacketed type, comprising: a first annular coupling means; a second annular coupling means; means extending between said first and second coupling means and making said first coupling means rotatable relative to said second coupling means about the longitudinal axis of the second coupling means; a cryogenic liquid conduit means concentrically disposed within said first and second coupling means and in spaced relation thereto; and means disposed between said coupling means and said conduit means for reducing the flow of heat from the ambient surroundings into a liquid in said conduit means, said last-mentioned means comprising: insulating members in the spaces between the coupling means and the cryogenic liquid conduit and gastight shrouds around said insulating members to minimize the transfer of heat between said coupling means and said conduit means by convection.

3. A cryogenic coupling according to claim 2, wherein the heat flow reducing means includes means providing an annular sealed space within said coupling means which can be evacuated to reduce the transfer of heat by conduction and convection into the liquid in the conduit means.

4. A cryogenic coupling according to claim 2, together with an evironmental sealing means disposed between said coupling means for keeping foreign matter from penetrating therebetween.

5. A cryogenic coupling according to claim 1, together with means associated with each of said coupling means for reducing the flow of heat from the ambient surroundings into the cryogenic liquid through joints at the opposed ends of said coupling.

6. A cryogenic coupling according to claim 1, together with a liquid seal means associated with each of said coupling means for restricting the outflow of liquid from said conduit means through joints at the opposed ends of said coupling.

7. A cryogenic coupling of the rotary, jacketed type, comprising: a first annular coupling means; a second annular coupling means; means extending between said first and second coupling means and making said first coupling means rotatable relative to said second coupling means about the longitudinal axis of the second coupling means; a cryogenic liquid conduit means disposed within said first and second coupling means and spaced therefrom, said conduit means comprising first and second conduit defining members and said first and second conduit defining members being rotatable with said first and second coupling means, respectively; a first dynamic seal means between said first and second conduit defining members for confining the cryogenic liquid to said conduit means while providing limited fluid communication between the inside and outside of the conduit means, whereby limited amounts of the cryogenic liquid can flow into and vaporize in a space between the conduit means and the coupling means and thereby equalize the hydrostatic pressure on the opposite sides of said seal means and reduce the pressure on the seal means to the head pressure of the cryogenic liquid in the conduit means; a second dynamic seal means between said first and second coupling means for preventing cryogenic liquid vapor in the space between the coupling means and the conduit means from escaping to the exterior of the coupling; and means in said space for reducing the flow of heat from the ambient surroundings into a cryogenic liquid in said conduit means.

8. A cryogenic coupling according to claim 7, together with a third dynamic seal between said coupling means for keeping foreign matter from penetrating to the interior thereof.

9. A cryogenic coupling of the rotary, jacketed type, comprising: a first annular coupling means; a second annular coupling means; means extending between said first and second coupling means and making said first coupling means rotatable relative to said second coupling means about the longitudinal axis of the second coupling means; a separate conduit means rotatable with each of said coupling means, said conduit means co-operating to form a cryogenic liquid flow conduit through the coupling within and concentric with the first and second coupling means and spaced therefrom, whereby there is an annular space between said conduit and said coupling means; means including a conical member surrounding and sealed at one end to one of said conduit means and at the other to the flange member of one of said coupling means for providing in said annular space a sealed annular chamber which surrounds and extends over at least the major portion of the cryogenic liquid conduit; and means for evacuating said sealed chamber to thereby reduce conductive and convective flow of heat from the ambient surroundings through the coupling into a cryogenic liquid in the conduit.

10. A cryogenic coupling according to claim 9, wherein one of said one cryogenic liquid forming means comprises a tubular member extending from one end of the coupling toward the other end thereof and an annular member fixed to the end of the tubular member nearest said other end of said coupling, said conical member being sealed at the one end thereof to said annular member.

11. A cryogenic coupling according to claim 10, wherein said one conduit forming means further includes a ring-like member sealed to said one end of said tubular member and wherein said one end of said tubular member is supported from the coupling means flange member at said one end of the coupling by means comprising a cylindrical member and a second conical member surrounding the tubular member, said cylindrical member being sealed at one end to said ringlike member and being surrounded by the second conical member, the inner end of the second conical member being sealed to the annular member at the other end of the cylindrical member and the outer end of the second conical member being sealed to the flange member, whereby said cylindrical and conical members also co-operate with the first mentioned conical member to define the annular, sealed, evacuatable chamber.

12. A cryogenic coupling according to claim 11, together with a conical insulation module disposed between the cylindrical and conical support members.

13. A cryogenic coupling according to claim 10, wherein the other of said cryogenic liquid conduit forming means comprises a ring member juxtaposed to said annular member, said annular and ring members having co-operating radial sealing surfaces and there being a liquid seal disposed between said last-mentioned members with portions thereof sealingly engaging each of said sealing surfaces.

14. A cryogenic coupling according to claim 13, wherein one of said ring and annular members in part overlies the other of said members, there being a member of a material having a low coefficient of friction between the members in the region in which they overlap to insure free relative rotation between said members.

15. A cryogenic coupling according to claim 13, together with a pair of liquid seals, wherein there is a second radial sealing surface on the ring member engageable by one of the liquid seals, there being a radial sealing surface on the ringlike member at said one end of said tubular conduit forming member engageable by the other of said pair of liquid seals.

16. A cryogenic coupling according to claim 10, wherein the other of said cryogenic liquid conduit forming means comprises a ringlike member and including means supporting said member from the other of said coupling means flange members which comprises a cylindrical member within and sealed at one end to said flange member and extending therefrom toward the other of said flange members and a conical member within the cylindrical member, the outer end of the conical member being sealed to the other end of the cylindrical member and the conduit forming member being sealed to the inner end of the conical member.

17. A cryogenic coupling according to claim 16, together with a conical insulation module between said cylindrical and conical support members.

18. In combination: a cryogenic coupling of the rotary, jacketed type, which includes a first annular coupling means, a second annular coupling means, means extending between said first and second coupling means and making said first coupling means rotatable relative to said second coupling means, and a cryogenic liquid conduit means disposed within said first and second coupling means and in spaced relation thereto; a pair of jacketed cryogenic components, each of said cryogenic components having a liquid conduit means; means for fixing one of said components to each of the first and second coupling means with the liquid conduit means of the component juxtaposed to and in fluid communication with the liquid conduit means in the coupling; and first and second means for reducing the flow of heat from the ambient surroundings into a cryogenic liquid in the conduit means through the coupling and through the joints between the coupling and the cryogenic components.

19. The combination of claim 18, wherein each of said cryogenic components includes an outer jacket and an inner conduit and wherein the means for reducing the flow of heat into the cryogenic liquid through the joint between each of said coupling means and the cryogenic component to which it is fixed includes a first annular sealing means disposed between and sealed to the coupling means and the cryogenic liquid conduit in the coupling and a second annular sealing means disposed between and sealed to the inner conduit and outer jacket of the cryogenic component; a liquid seal means between the cryogenic liquid conduit and the inner conduit of the cryogenic component for restricting the outflow of the cryogenic liquid through the joint between said conduits to such an extent that the outflowing liquid will vaporize and not create a liquid short but will equalize the hydrostatic pressure on the inner and outer sides of the joint and thereby reduce the pressure on the liquid seal means to the head pressure of the cryogenic liquid.

20. The combination of claim 19, together with means in the spaces defined by said first and second annular sealing means for minimizing convection currents therein which comprises a pair of juxtaposed insulation modules, each of said insulation modules including an annular body of a structurally integral material having a low thermal conductivity and a substantially gastight shroud surrounding said body.

21. The combination of claim 20, wherein each coupling means includes an annular flange member and including a flange integrated with the outer jacket of the associated cryogenic component and facing the coupling means flange member, there being an annular sealing member between and in sealing relationship with said flange and flange member to prevent the outflow of cryogenic liquid vapor through the interface therebetween.

22. The combination of claim 19, wherein said first annular sealing means comprises a cylindrical member surrounding the cryogenic liquid conduit in the coupling; means adjacent said joint providing a seal between the conduit and one end of the cylindrical member; and a conical member surrounding the cylindrical member, the inner end of the conical member being sealed to the other end of the cylindrical member and the outer end thereof being sealed to the coupling means flange member and wherein said second annular sealing means comprises a cylindrical member surrounding the inner conduit of the cryogenic component, means adjacent the joint providing a seal between the cylindrical member and the inner conduit, and a condical member surrounding the cylindrical member, the inner end of the cylindrical member being sealed to the other end of the cylindrical member and the outer end thereof being sealed to the outer jacket of the cryogenic component.

23. The combination of claim 22, wherein the means providing seals between the cylindrical member of the first annular sealing means and the conduit in the coupling and between the cylindrical member of the second annular sealing means and the inner conduit of the cryogenic component comprise juxtaposed annular rings, there being facing sealing surfaces on said rings and said liquid seal being disposed between said annular rings and engaging the sealing surfaces thereof.

24. A cryogenic coupling of the rotary, jacketed type, comprising: a first annular coupling means; a second annular coupling means; means extending between said first and second coupling means and making said first coupling means rotatable relative to said second coupling means about the longitudinal axis of the second coupling means; a cryogenic liquid conduit means concentrically disposed within said first and second coupling means and in spaced relation thereto, said conduit means comprising members rotatable with said first and second coupling means, respectively; a liquid seal means between said members for confining the cryogenic liquid to said conduit means while providing limited fluid communication between the inside and outside of the conduit means, whereby limited amounts of the cryogenic liquid can flow into and vaporize in a space between the conduit means and the couplings and thereby equalize the hydrostatic pressure on the opposite sides of said seal means and reduce the pressure on the seal means to the head pressure of the cryogenic liquid in the conduit means; and means disposed between said coupling means and said conduit means for reducing the flow of heat from the ambient surroundings into a liquid in said conduit means.

25. A cryogenic coupling according to claim 24, together with means in the space in which the cryogenic liquid vapor exists for reducing circulation of said vapor and thereby keeping heat from being transferred into the cryogenic liquid in the conduit means by convection.

26. A cryogenic coupling according to claim 24, together with sealing means between said coupling means for preventing cryogenic liquid vapor from leaking between said coupling means to the exterior of the coupling.

27. A cryogenic coupling of the rotary type, comprising a pair of flange members; bearing sleeves fixed to said flange members and co-operating therewith to provide first and second coupling means; bearing means disposed between said sleeves for making each of said flanges rotatable relative to the other; means including a member rotatable with each of said coupling means for providing a cryogenic liquid flow component concentrically disposed within the coupling means, whereby there is an annular space between said conduit means and the coupling means; and means in said annular space for reducing the flow of heat from the ambient surroundings through the coupling into a cryogenic liquid in said conduit means, the flange member and bearing sleeve of one of said coupling means having portions engageable with opposite ends of said bearing means; the sleeve of said one coupling means being threaded onto the flange member thereof; and there being alignable apertures in the other coupling means and the sleeve of said one coupling means through and into which a tool can be inserted to preclude relative rotation therebetween, whereby the flange member of said one coupling means can be rotated relative to the sleeve thereof to decrease the distance between the bearing means engageable portions of the flange member and sleeve and thereby preload said bearings, there also being means carried by the flange member of said one coupling means which is engageable with the sleeve thereof to retain the flange member in the position to which it is adjusted relative to said sleeve.

28. A cryogenic coupling of the rotary type, comprising a pair of flange members; bearing sleeves fixed to said flange members and cooperating therewith to provide first and second coupling means; bearing means disposed between said sleeves for making each of said flanges rotatable relative to the other; means including a member rotatable with each of said coupling means for providing a cryogenic liquid flow component concentrically disposed within the coupling means, whereby there is an annular space between said conduit means and the coupling means; means in said annular space for reducing the flow of heat from the ambient surroundings through the coupling into a cryogenic liquid in said conduit means; co-operating radial sealing surfaces on the flange member of said one coupling means and on the bearing sleeve of the other coupling means; a dynamic environmental seal surrounding said just-mentioned flange member and having portions sealingly engaging said radial sealing surfaces; co-operating radial sealing surfaces on the sleeve of said one coupling means and on the flange member of the other coupling means; and an annular, dynamic, primary gas seal surrounding the cryogenic liquid conduit means and having portions thereof in sealing engagement with said last-mentioned sealing surfaces.

* * * * *